Nov. 15, 1927.
Z. J. SOUCY
TOOL
Filed Feb. 20, 1925
1,649,495
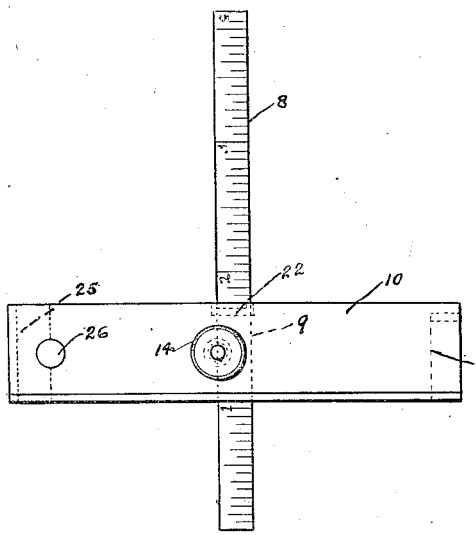
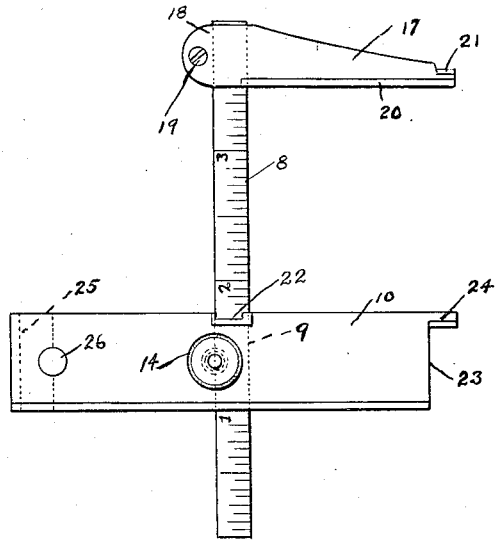
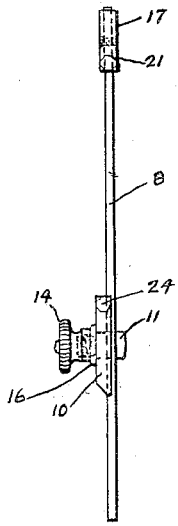
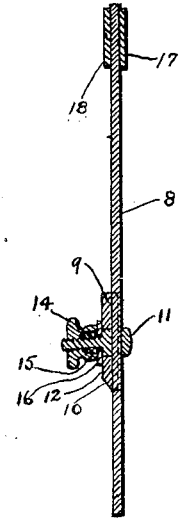
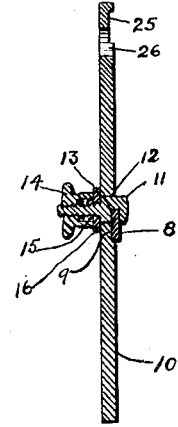
INVENTOR.
BY Zenon J. Soucy.
Morsell, Keeney & Morsell
ATTORNEYS.

Patented Nov. 15, 1927.

1,649,495

UNITED STATES PATENT OFFICE.

ZENON J. SOUCY, OF MILWAUKEE, WISCONSIN.

TOOL.

Application filed February 20, 1925. Serial No. 10,530.

This invention relates to improvements in tools.

It is one of the objects of the present invention to provide an attachment for a depth gage which will convert the same into a combination tool.

A further object of the invention is to provide a unitary attachment for depth gages so designed that it can be readily attached to a depth gage, by means of which attachment and a slight modification of the gage, the gage may be used as a number of tools, including an inside caliper, an outside caliper, a micrometer, a scale and a gage.

A further object of the invention is to provide an attachment of the class described which can be fitted to a depth gage very easily, the slight modifications required in the gage being readily accomplished by the ordinary mechanic.

A further object of the invention is to provide an attachment of the class described which can be sold as a unit, which is of very simple construction, is inexpensive to manufacture, is strong and durable, and is well adapted for the purposes described.

With the above and other objects in view, the invention consists of the improved tool, and its parts and combinations as set forth in the claims, and all equivalents thereof.

In the accompanying drawing in which the same reference characters indicate the same parts in all of the views:

Fig. 1 is a view of a depth gauge of ordinary construction;

Fig. 2 is a view of an ordinary depth gage fitted with the improved attachment, the depth gage being slightly modified to adapt it to the attachment;

Fig. 3 is an edge view of a depth gage fitted with the attachment;

Fig. 4 is a longitudinal sectional view thereof; and

Fig. 5 is a sectional view taken through the adjustable cross member of the depth gage.

Referring now more particularly to the drawing, it will be seen that Fig. 1 illustrates a depth gage of ordinary construction having a graduated scale or rule 8 slidable within the slot 9 of a cross arm 10. The scale is adjustably clamped in position by means of a shouldered stud 11 passed through an opening 12 in the cross arm. The lower end portion of the stud is slotted as at 13 to receive the slidable scale and the upper end portion of the stud is reduced and threaded to receive a turn cap 14. A coiled spring 15 surrounds a portion of the stud 11 and is confined within an opening in the cap 14 and bears against a washer 16. By this construction the stud is under tension at all times and the scale is held in adjusted position even when the cap 14 is loosened.

The invention resides particularly in an attachment for converting the depth gage illustrated in Fig. 1 into a combination tool and said attachment comprises a tapered arm 17 having a slotted or bifurcated inner end portion to receive one end portion of the scale 8, the arm 17 being clamped thereto by means of a screw 19. The inner edge portion of the arm is beveled as at 20 and the outer tapered end portion is reduced and beveled as at 21, for the purpose hereinafter to be set forth.

After attaching the arm 17 to the end portion of the scale, the depth gage may be easily modified to adapt it for the new uses provided for by the attachment. The only modifications required are milling out portions of the arm 10 as indicated by the dotted lines in Fig. 1, at 22 and 23. The milled out portion 22 facilitates readings on the scale and increases the accuracy of the device and the milled out portion 23 provides a beveled shoulder 24.

With the device fitted with the improved attachment and modified as described, it can be used as a depth gage. Also it can be used as an inside caliper by adjusting it so that the outer edges of the shouldered portions 21 and 24 contact with the opposite inside surfaces of the article to be measured, in this event the width of the two shoulders being added to the reading. When used as an outside caliper, the inner edges of the arms 10 and 17 contact with the outer surfaces of the article measured, and the reading is taken from the scale.

It will be noted that the depth gage arm 10 is provided with the usual outer slot 25 wherein the scale may be inserted if desired. In this event, an aperture 26, accommodates the stud 11.

From the foregoing description it will be seen that the improved attachment for depth gages increases the uses of a depth gage and converts the same into a handy, combination tool. The modifications required are very simple and are easily made by the ordinary mechanic. Also the attachment is of very simple and novel construction, and is well adapted for the purpose set forth.

What I claim as my invention is:

A tool, comprising a graduated scale, an adjustable cross arm mounted thereon said cross arm having a U-shaped portion adjacent the scale cut away and the edges adjacent the scale beveled to facilitate the taking of readings and also having one end cut to provide a measuring shoulder, an arm having a straight beveled edge and an opposite tapering edge, the tapering edge portion of said arm being cut away and beveled to form a measuring shoulder, one end portion of the arm being of bifurcated form to receive said scale at right angles to the straight edge of the arm, and screw means for clamping the arm to the scale.

In testimony whereof, I affix my signature.

ZENON J. SOUCY.